G. Stackhouse,
Meat Cutter.
No. 78,149.
Patented May 19, 1868.
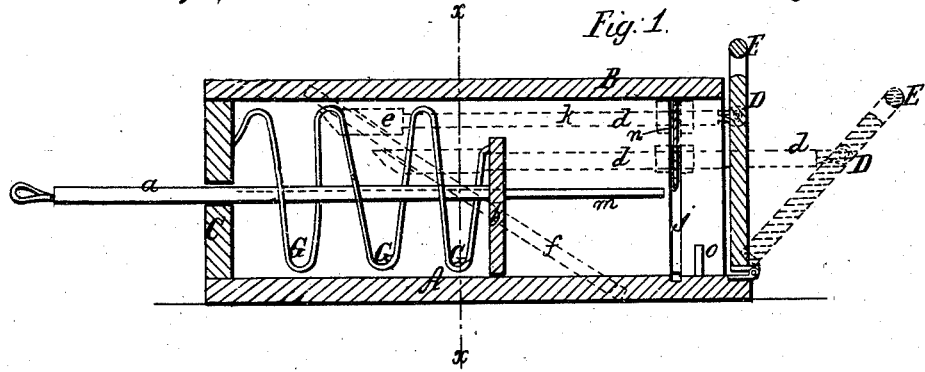
Fig. 1.
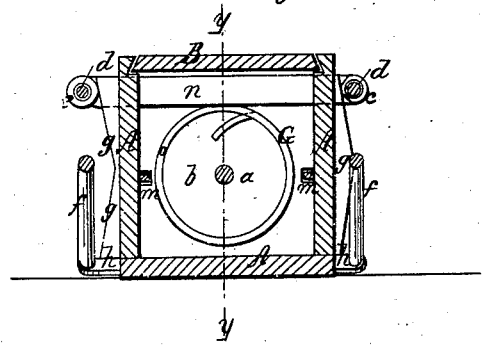
Fig. 2.
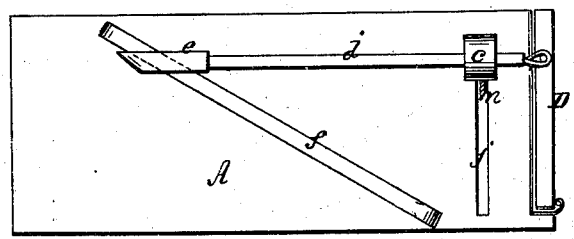
Witnesses;
Alex F. Roberts
H. C. Ashkettle
Inventor;
G. Stackhouse
per Munn &Co
Attorneys

United States Patent Office

GEORGE STACKHOUS, OF MOUNT WASHINGTON, PENNSYLVANIA.

Letters Patent No. 78,149, dated May 19, 1868.

IMPROVED BREAD, MEAT, AND VEGETABLE-CUTTER.

*The Schedule referred to in these Letters Patent and making part of the same.*

TO ALL WHOM IT MAY CONCERN:

Be it known that I, GEORGE STACKHOUS, of Mount Washington, in the county of Allegheny, and State of Pennsylvania, have invented a new and useful Improvement in a Device for Cutting Bread, Meat, Vegetables, and other substances; and I do hereby declare that the following is a full, clear, and exact description thereof, which will enable others skilled in the art to make and use the same, reference being had to the accompanying drawings, forming part of this specification, in which—

Figure 1 is a sectional view of my invention, through the line $y\ y$, fig. 2.

Figure 2 is a cross-section of the invention, through the line $x\ x$ of fig. 1.

Figure 3 is a side view of the same.

Similar letters of reference indicate like parts.

The object of this invention is to accomplish the cutting or slicing of bread, meat, vegetables, and other similar substances, in a rapid, even, and expeditious manner.

The cutting-mechanism is contained in a box, A A A C, having a sliding top, B, and hinged end D, the latter being hinged to the bottom of the box, as shown.

The slicing is accomplished by means of a horizontal knife, $n$, which has a vertical motion in slots $j$, in each side of the box.

The requisite motion is imparted to the knife by means of the exterior rods $f\!f$, the ends of which are affixed to the sides of the box, with their front ends inclined toward the bottom of the box, as shown.

These rods are set out from the box by means of the projections $h\ h$, which latter serve to affix them to the sides.

The upper ends of the rods are set out in a similar manner, by which arrangement the eyes $e$, forming part of the rod $d\ d$, and which work with loose contact upon the said inclined rods, are enabled to slide freely up and down the same, as the machine is operated.

The front ends of the rods $d\ d$ are provided with eyes $i$, which work loosely on pins $k$, projecting from the lateral edges of the hinged end D, whereby, when the said hinged end is swung open, as shown in red in fig. 1, the rods $d\ d$ are brought down with a parallel motion, as shown by the red position of the rods in fig. 1.

These rods slide freely through the eyes $c\ c$, at each end of the knife or cutter $n$, and as the rods are raised or lowered, the knife will also be raised or lowered, by which operation the bread or other substance is sliced.

The movable partition $b$ slides upon the guide-strips $m\ m$, affixed to the inner sides of the box for that purpose, and the partition $b$ is correspondingly slotted, to work on the said guide-strips.

The partition $b$ is actuated toward the knife by the coiled-spring G or other suitable spring or springs. The partition $b$ is retracted by means of the rod $a$, which is affixed to the partition, and passes through the end, C, as shown.

The terminal coils of the spring G are affixed to the partition, and to the end, C, and the rod $a$ passes within the said spring, as shown.

To each side of the box are affixed the vertical strips $g\ g$, one being convex, and the other correspondingly concave, and as the eyes $c\ c$ of the knife are in contact with these strips throughout their upward and downward movement, a lateral motion is thereby imparted to the knife as it descends, in the operation of cutting, which lateral motion conduces to the more perfect slicing of the substance.

A pin, $o$, limits the forward movement of the substance, as it is pushed under the knife, as each successive slice is cut off and removed, whereby the slices are all made of the same thickness.

This pin or its equivalent may be so arranged as to be adjustable to or from the plane of the knife's movement, so that thinner or thicker slices may be obtained at pleasure.

The rods $f\!f$ may be substituted by similarly-inclined plates, having slots for stud-pins projecting from the rod $d\ d$ to work in, or the sides of the box itself may be slotted in a similar manner for the reception of the said stud-pins.

Another modification may be made by affixing flanged plates, suitably inclined, and providing the rods $d\ d$ with suitable open eyes to work on the flanges; but in all these modifications, the principle of an inclined surface, by which the rods $d\ d$ and the knife $n$ are raised or lowered by the action of the hinged end, would be employed.

The hinged end is provided with a handle, E, convenient for grasping in operating the machine.

From what has been set forth, the operating of the mechanism will be understood.

The sliding top B is withdrawn, and the partition $b$ retracted, to place the substance to be cut in the box.

The rod $a$ is then released, and the spring actuates the said substance against the pin $o$, as each slice is cut and removed.

In order to bring the knife down to the bottom, the end, D, must be swung down horizontally.

Having thus described my invention, I claim as new, and desire to secure by Letters Patent—

1. The inclined actuating-surfaces $f\ f$, connected with a hinged end, D, by rods $d\ d$, all substantially as described, for the purpose of operating the knife $n$, all as set forth.

2. The movable partition $b$, operated by spring-tension, substantially as and for the purpose described, in combination with the inclined rods $f\ f$, hinged end D, and knife $n$, all as set forth.

3. The box A A A C, having a sliding top, B, hinged end D, and slots $j$, in combination with the spring G, partition $b$, and knife $n$, all as set forth.

4. The concave and convex strips $g\ g$, substantially as described, in combination with the inclined surface $f\ f$, rods $d\ d$, hinged end D, and knife $n$, for the purpose of imparting a lateral movement to the latter, all as set forth.

The above specification of my invention signed by me, this 26th day of March, 1868.

GEORGE STACKHOUS.

Witnesses:
J. DONALDSON,
JAMES JOHNSON.